(12) United States Patent
Thomas et al.

(10) Patent No.: US 8,509,448 B2
(45) Date of Patent: Aug. 13, 2013

(54) METHODS AND DEVICE FOR SECURE TRANSFER OF SYMMETRIC ENCRYPTION KEYS

(75) Inventors: Shanthi E. Thomas, Carpentersville, IL (US); Michael W. Bright, Arlington Heights, IL (US); Chris A. Kruegel, Plainfield, IL (US); Anthony R. Metke, Naperville, IL (US); Scott J. Pappas, Lake Zurich, IL (US); Thomas J. Senese, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1049 days.

(21) Appl. No.: 12/511,731

(22) Filed: Jul. 29, 2009

(65) Prior Publication Data

US 2011/0026714 A1 Feb. 3, 2011

(51) Int. Cl.
*G06F 21/00* (2006.01)
(52) U.S. Cl.
USPC ............. 380/282; 380/281; 380/278; 705/71; 713/171
(58) Field of Classification Search
None
See application file for complete search history.

(56) References Cited

U.S. PATENT DOCUMENTS

| | | | |
|---|---|---|---|
| 5,142,578 A * | 8/1992 | Matyas et al. | 380/280 |
| 5,146,497 A | 9/1992 | Bright | |
| 5,150,408 A * | 9/1992 | Bright | 380/273 |
| 5,164,986 A | 11/1992 | Bright | |
| 5,185,795 A | 2/1993 | Bright | |
| 6,049,878 A * | 4/2000 | Caronni et al. | 726/3 |
| 6,263,435 B1 * | 7/2001 | Dondeti et al. | 713/163 |
| RE40,708 E * | 5/2009 | Dondeti et al. | 713/163 |
| 7,773,754 B2 * | 8/2010 | Buer et al. | 380/277 |

(Continued)

FOREIGN PATENT DOCUMENTS

| | | |
|---|---|---|
| EP | 1549010 A1 | 6/2005 |
| WO | WO2009056679 A2 | 5/2009 |
| WO | WO2009089908 A1 | 7/2009 |

OTHER PUBLICATIONS

TIA/EIA Standard; Tiaeia-102.AACA, Apr. 12, 2001; Project 25—Digital Radio Over the Air Rekeying (OTAR) Protocol; pp. 12-146.*

(Continued)

*Primary Examiner* — Nathan Flynn
*Assistant Examiner* — Michael R Vaughan
(74) *Attorney, Agent, or Firm* — Valerie M. Davis; Kenneth A. Haas

(57) ABSTRACT

A sending device generates a first and a second KMM, wherein the first KMM includes a first KEK and a KMM encryption key, and the second KMM includes a set of symmetric encryption keys. The sending device further encrypts the set of symmetric encryption keys using the first KEK; encrypts the first KEK and the KMM encryption key using a first public key of a receiving device; and encrypts the second KMM using the KMM encryption key to generate an encrypted second KMM before sending the first KMM and the encrypted second KMM to the receiving device. The receiving device decrypts the first KEK and the KMM encryption key using a first private key that corresponds to the first public key; and decrypts the encrypted second KMM using the KMM encryption key to obtain the encrypted set of symmetric keys.

7 Claims, 4 Drawing Sheets

(56) References Cited

U.S. PATENT DOCUMENTS

| | | | | |
|---|---|---|---|---|
| 2002/0018571 | A1* | 2/2002 | Anderson et al. | 380/277 |
| 2003/0063750 | A1* | 4/2003 | Medvinsky et al. | 380/277 |
| 2004/0005061 | A1* | 1/2004 | Buer et al. | 380/282 |
| 2004/0044739 | A1* | 3/2004 | Ziegler | 709/213 |
| 2005/0047600 | A1* | 3/2005 | Newkirk | 380/278 |
| 2006/0018473 | A1* | 1/2006 | Hori | 380/255 |
| 2006/0053077 | A1* | 3/2006 | Mourad et al. | 705/51 |
| 2006/0168446 | A1* | 7/2006 | Ahonen et al. | 713/163 |
| 2006/0233371 | A1* | 10/2006 | Sowa et al. | 380/248 |
| 2007/0098171 | A1* | 5/2007 | Sowa et al. | 380/247 |
| 2008/0137863 | A1* | 6/2008 | Thomas | 380/273 |
| 2009/0092254 | A1* | 4/2009 | Lee et al. | 380/278 |
| 2009/0274302 | A1* | 11/2009 | Wu et al. | 380/272 |
| 2009/0282246 | A1* | 11/2009 | Gunther | 713/168 |
| 2010/0074446 | A1* | 3/2010 | Fuchs et al. | 380/278 |
| 2010/0290624 | A1* | 11/2010 | Buer et al. | 380/277 |
| 2011/0249817 | A1* | 10/2011 | Park et al. | 380/281 |

OTHER PUBLICATIONS

PCT International Search Report Dated Sep. 20, 2010.

Chris A. Kruegel, et al. "Detection and Recovery of the Signaling Encryption Key for OTAK to Limit the Exposure of the Key Encryption Key"; IP.COM Journal, IP.COM Inc., West Henrietta, NY, USA; Apr. 27, 2005; XP013024342; ISSN:1533-0001.

International Preliminary Report on Patentability and Written Opinion for counterpart International Application No. PCT/US2010/042824 mailed on Feb. 9, 2012.

R. Housley, Network Working Group, RFC 3852, Vigil Security, Jul. 2004.

TIA Standard; Project 25; Digital Radio Over-The-Air Rekeying (OTAR) Protocol; Addendum 2—Date Link Independent OTAR; ANSI/TIA-102.AACA-2-2003; March 13, 2003.

* cited by examiner

METHODS AND DEVICE FOR SECURE TRANSFER OF SYMMETRIC ENCRYPTION KEYS

TECHNICAL FIELD

The technical field relates generally to secured communications and more particularly to secure distribution of symmetric encryption keys in a communication system.

BACKGROUND

Many communication systems enable secure communications between a sending device and a receiving device by the use of symmetric traffic encryption keys (TEKs) comprising an encryption key and a decryption key that are identical and that are used to maintain a private information link between the devices. In this manner, the symmetric TEKs are said to represent a shared secret between the sending and receiving devices because both the encryption key and the decryption key are known by all devices that use them. However, the symmetric TEKs must be securely provisioned in the sending and receiving devices before they can be used. Moreover, if the sending and receiving devices are, for example, from different agencies and have a need to interoperate (such as at an incident scene), a Key Management Facility (KMF) for each agency, which facilitates secure key management and distribution for devices used by agency personnel, would need to agree upon a set of symmetric keys for use by the devices of both agencies.

It is known to use symmetric key encryption keys (KEKs) to securely transfer the symmetric TEKs from a KMF to an endpoint device. As with the symmetric TEKs, the symmetric KEKs represent a shared secret between the KMF and the endpoint device. The problem is that use of symmetric KEKs involves potentially complex key management procedures and can involve out-of-band (e.g., manual or otherwise) seeding of initial KEKs, which can introduce additional risk to the system. Moreover, symmetric key management can be tedious and inconvenient in most scenarios, particularly at an incident scene where two agencies need to communicate with each other without prior notice.

Thus, there exists a need for a mechanism for securely transferring symmetric encryption keys in a communication system.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
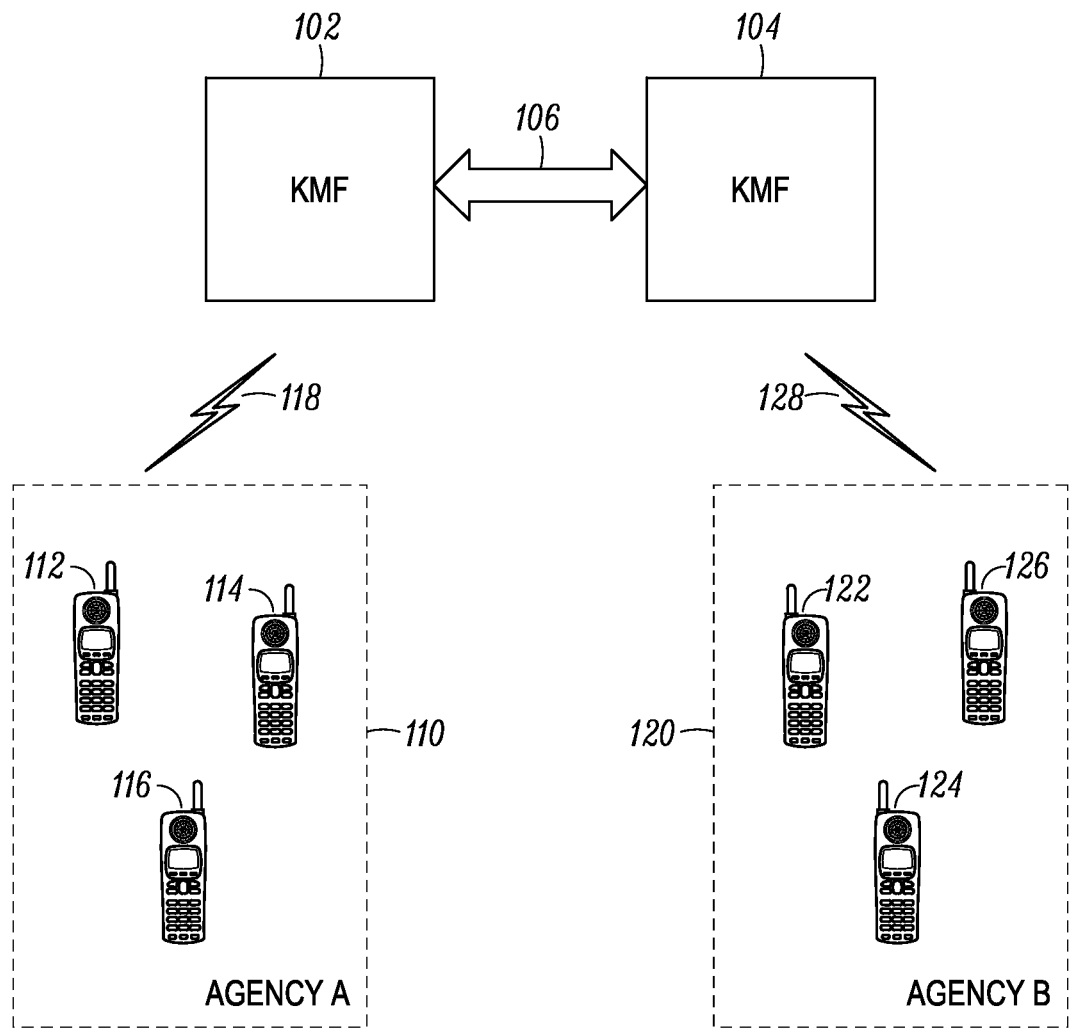
FIG. 1 is a block diagram of a system in which secure transfer of symmetric encryption keys is implemented in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a sending device generates a first and a second key management message (KMM), wherein the first KMM includes a first key encryption key and a KMM encryption key, and the second KMM includes a set of symmetric encryption keys. The sending device further encrypts the set of symmetric encryption keys, included in the second KMM, using the first key encryption key; encrypts the first key encryption key and the KMM encryption key, included in the first KMM, using a first public key of a receiving device; and encrypts the second KMM using the KMM encryption key to generate an encrypted second KMM before sending the first KMM and the encrypted second KMM to the receiving device. The receiving device receives the first and second KMMs; decrypts the first key encryption key and the KMM encryption key using a first private key of the receiving device, wherein the first private key corresponds to the first public key; and decrypts the encrypted second KMM using the KMM encryption key to obtain the encrypted set of symmetric keys for at least one of storing or forwarding to another device.

Implementing embodiments of the teachings herein enables provisioning of devices with symmetric encryption keys without initial manual or other out-of-band seeding, thereby increasing the efficiency and decreasing the complexity of such initial provisioning. Those skilled in the art will realize that the above recognized advantages and other advantages described herein are merely illustrative and are not meant to be a complete rendering of all of the advantages of the various embodiments.

Referring now to the drawings, and in particular FIG. 1, a block diagram of a system in which secure transfer of symmetric encryption keys is implemented in accordance with some embodiments is shown and indicated generally at 100. Those skilled in the art, however, will recognize and appreciate that the specifics of this example are merely illustrative of some embodiments and that the teachings set forth herein are applicable in a variety of alternative settings. For example, since the teachings described do not depend on the type of communication system in which the embodiments are implements, they can be applied to any type of communication system that implements key management facilitated by public key cryptography.

System 100 includes a KMF 102 and a KMF 104 communicatively coupled via a communication channel 106. System 100 further includes a group 110 of end communication devices 112, 114, and 116 that are communicatively coupled to KMF 102 via a communication channel 118 and a group 120 of end communication devices 122, 124, and 126 that are communicatively coupled to KMF 104 via a communication channel 128. System 100 can be a wired system, a wireless system, or a system enabling both wired and wireless communications.

A commercial embodiment of system 100 may include additional KMFs and/or end devices. However, only a few such devices are shown in FIG. 1 to facilitate ease of illustration. In addition, although not shown in FIG. 1 for clarity of illustration, in a commercial embodiment, system 100 further includes a numbers of infrastructure devices for facilitating communications between each KMF and its respective group of end devices and for facilitating communications between the end devices themselves. Such infrastructure devices may include, but are not limited to, bridges, switches, zone controllers, base station controllers, repeaters, base radios, base stations, base transceiver stations, access points, routers or any other type of infrastructure equipment interfacing an end device in a wireless or wired environment. For example, each KMF may be connected to a base station via a wired connection, and the base station, in turn, wirelessly connects to the end devices, thereby facilitating communications between the end devices and the KMF and communications between the end devices themselves.

KMF 102 and 104 and the end devices both use symmetric key cryptography and public key cryptography. Public key cryptography is defined as a cryptographic technique that uses a public key and private key pair generated by a particular device to secure communications between that device and other devices, wherein the public key is used to encrypt communications and is known by all devices using it, and the private key (which is a completely different key than the public key) is used to decrypt communications. Contrast this to symmetric key cryptography that is defined as a cryptographic technique that uses symmetric encryption keys comprising an encryption key and a decryption key that are identical and known by all devices that use them. Accordingly, system 100 also includes a public key infrastructure (PKI), not shown, that includes one or more certificate authorities (CAs), registration authorities (RAs), and directory services to facilitate public key cryptography through the management of public keys and certificates.

Turning back to the elements of system 100 shown in FIG. 1, KMF 102 facilitates secure key management and distribution (including distribution of symmetric encryption keys in accordance with the disclosure herein) for the devices within group 110; and KMF 104 facilitates secure key management and distribution (including the distribution of symmetric encryption keys in accordance with the disclosure herein) for the devices within group 120. In one embodiment, each KMF is Project 25 (or P25) compliant, wherein P25 refers to a suite of standards developed through the joint efforts of the Association of Public Safety Communications Officials International (APCO), the National Association of State Telecommunications Directors (NASTD), selected Federal Agencies and the National Communications System (NCS), and standardized under the Telecommunications Industry Association (TIA) to enable digital radio communications between federal, state/province and local public safety agencies in North America, for example, during emergencies. Further, each KMF includes memory, one or more network interfaces, and a processing device operatively coupled to enable the KMF's functionality including the use of symmetric key cryptography, the use of public key cryptography, and the implementation of methods in accordance with the teachings herein.

The network interfaces of the KMF are used at least for communicating with another KMF and communicating with the end devices (for instance via one or more infrastructure devices) to enable the implementations of methods in accordance with embodiments of the present disclosure. The implementation of the network interfaces depends on the particular type of system 100, i.e., wired and/or wireless, to which the KMF is connected. For example, where system 100 supports wired communications, the network interfaces may comprise a serial port interface (e.g., compliant to the RS-232 standard), a parallel port interface, an Ethernet interface, a USB interface, and/or a FireWire interface, and the like. Where the system 100 supports wireless communications, the network interfaces comprise elements including processing, modulating, and transceiver elements that are operable in accordance with any one or more standard or proprietary wireless interfaces, wherein some of the functionality of the processing, modulating, and transceiver elements may be performed in the processing device through programmed logic. Accordingly, communication channel 106 is a communication path between the network interfaces of KMF 102 and 104, which is comprised of one or more wired or wireless links depending on the architecture of system 100.

Besides the above-mentioned functionality, implemented via programmed logic, the processing device in each KMF is further programmed with logic for implementing methods (such as methods 200 and 400 described below by reference to FIG. 2 and FIG. 4) for the secure transfer of symmetric encryption keys in accordance with the teachings herein. The memory in KMF 102 and 104 can include short-term and long-term storage of various data, e.g., various keys needed to encrypt and decrypt data and/or to encrypt and decrypt other keys, and can further include software for programming the processing device with the logic needed to perform its functionality.

End devices 112, 114, 116, 122, 124, and 126 can be any standard communication device such as radios, mobile stations, subscriber units, mobile phones, Personal Digital Assistants (PDAs), laptops, two-way radios, cell phones, and the like. One or more of the end device is also P25 compliant, in this illustrative example, and each end device includes memory, one or more network interfaces, and a processing device operatively coupled to carry out their functionality including the use of symmetric key cryptography, the use of public key cryptography, and the implementation of methods in accordance with the teachings herein.

The network interfaces of the end devices are used at least for communicating with another end device and communicating with a KMF (for instance via one or more infrastructure devices) to enable the implementations of methods in accordance with embodiments of the present disclosure. The implementation of the network interfaces depends on the particular type of system 100, i.e., wired and/or wireless, to which the end device is connected. Where the system 100 supports wireless communications, the network interfaces comprise elements including processing, modulating, and transceiver elements that are operable in accordance with any one or more standard or proprietary wireless interfaces, wherein some of the functionality of the processing, modulating, and transceiver elements may be performed in the processing device through programmed logic. Accordingly, communication channel 118 is a communication path between the network interfaces of KMF 102 and end devices 112, 114, and 116, which is comprised of one or more wired or wireless links depending on the architecture of system 100; and communication channel 128 is a communication path between the network interfaces of KMF 104 and end devices 122, 124, and 126, which is comprised of one or more wired or wireless links depending on the architecture of system 100.

Besides the above-mentioned functionality, implemented via programmed logic, the processing device in each end device is further programmed with logic for implementing methods (such as method 400 described below by reference to FIG. 4) for the secure receipt of symmetric encryption keys in accordance with the teachings herein. The memory in the end devices 112, 114, 116, 122, 124, and 126 can include short-term and long-term storage of various data, e.g., various keys needed to encrypt and decrypt data and/or encrypt and decrypt other keys, and can further include software for programming the processing device with the logic needed to perform its functionality.

In one illustrative scenario, each communication device in group 110 is used by an official, from an agency A, which was called to an incident scene; and each communication device in group 120 is used by an official, from an agency B, which was called to the same incident scene. In this illustrative scenario, the officials from Agencies A and B desire that their respective devices be able to interoperate and that the communications between their respective devices be secured using symmetric key cryptography. In accordance with the teachings herein as described below by reference to FIGS. 2 to 4, public key cryptography is used to facilitate the transfer of symmetric encryption keys in key management messages to enable the secure messaging between end devices 112, 114, 116, 122, 124, and 126.

Figure 2:
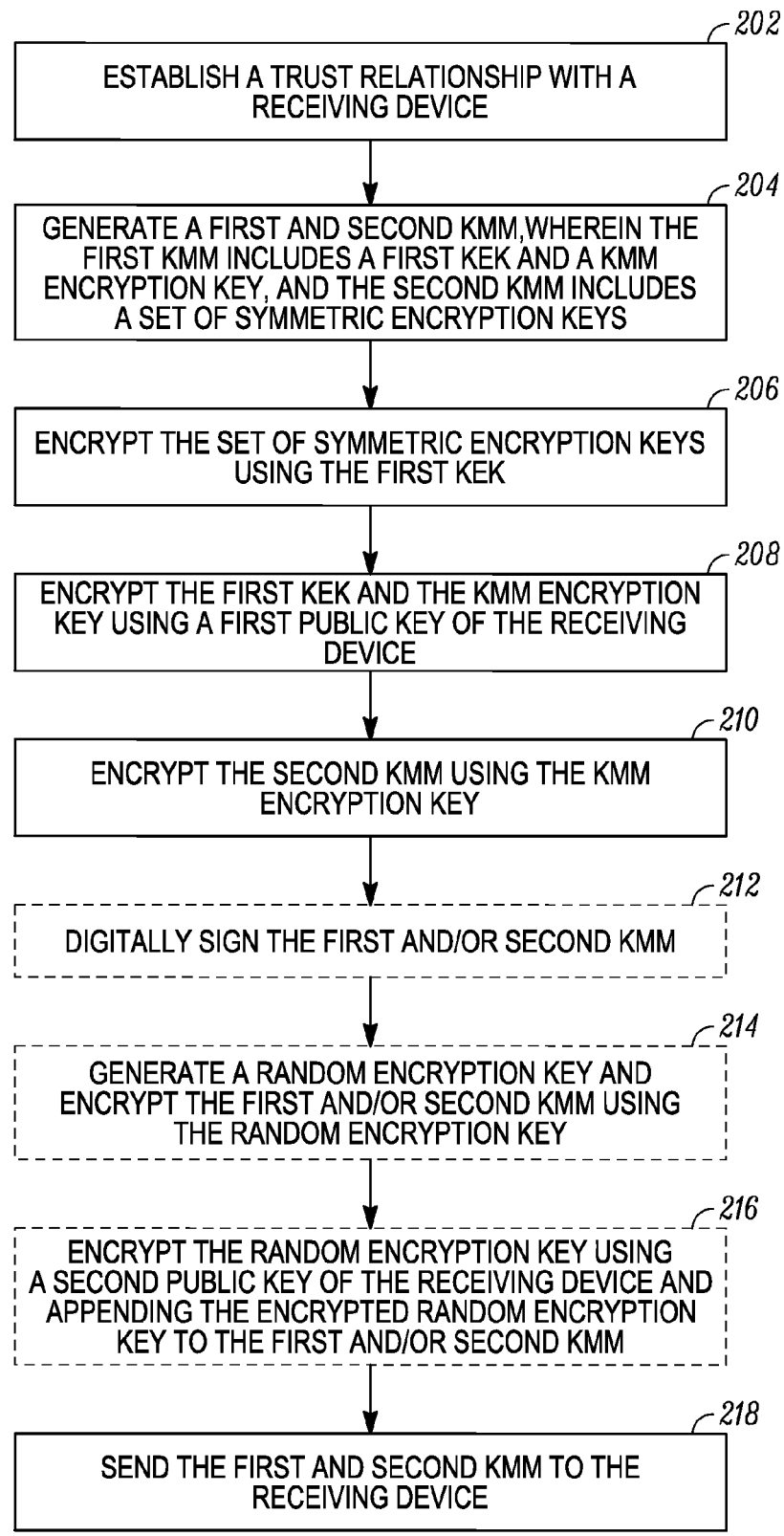
FIG. 2 is a flow diagram of a method implemented in a sending device for enabling secure sending of symmetric encryption keys in accordance with some embodiments.

Turning now to FIG. 2, a method implemented in a sending device for enabling secure transfer of symmetric encryption keys in accordance with some embodiments is shown and generally indicated at 200. FIG. 2 will be described in conjunction with FIG. 3, which shows an illustrative key management message (KMM) bundle 300 that can be generated using method 200. Bundle 300 comprises two separate KMMs included in a single message, also referred to herein as a "combined KMM". However, in another embodiment, each KMM can be sent in a separate message, but including both KMMs in a combined KMM tends to provide some efficiency in the system by decreasing the amount of signaling between the two devices that is needed to securely transfer the necessary symmetric encryption keys.

Any sending device can implement method 200 to securely forward symmetric encryption keys to any receiving device. However, for ease of understanding, method 200 is described below by reference to KMF 102 as the sending device and KMF 104 as the receiving device. However, this illustrative example in no way limits the scope of the types sending devices that may implement method 200 and in no way limits the types of receiving devices to which the symmetric encryption keys are forwarded. In an embodiment, the processing device of the sending device is programmed with logic for performing at least some of the functional steps of method 200 as hereinafter described; thereby being implemented as a special purpose processor or special purpose computer programmed to perform method 200. In other words, this special purpose computer is the structure that serves as the means for performing the functionality of method 200.

In one illustrative example, KMF 102 for Agency A and KMF 104 for Agency B agree to use the symmetric TEKs and optionally one or more KEKs provisioned in the KMF 102 and in devices 112, 114, 116 to enable secure communications between these devices and devices 104, 122, 124, and 126. Accordingly, KMF 102 (the sending device) uses method 200 to securely send these TEKs and KEKs to KMF 104 (the receiving device), which then uses method 200 (as the sending device) to securely provision the devices 122, 124, and 126 (further receiving devices) with the TEKs.

As is done in systems concerned with maintaining private communications between parties that are authorized to send and receive the information, KMF 102 and KMF 104 establish (202) a trust relationship to verify their identities before exchanging any information. In a system, such as system 100, that implements a PKI, this can be done through the exchange of digital public key certificates issued by a CA. More particularly, KMF 102 and KMF 104, which are initially unknown to each other, each individually establish a trust relationship with a CA. The CA performs some level of entity authentication, according to established rules and then issues each KMF (and/or individual operating the KMF) a digital certificate, which is signed by the CA and thus vouches for the identity and corresponding public key(s) of KMF 102 or KMF 104. An illustrative format of a digital certificate is one based on the Internet Engineering Task Force (IETF) X.509 standards found in the IETF Request for Comments (RFC) 2459 dated January 1999 and any subsequent revisions. KMF 102 and KMF 104 can now use their respective digital certificates to establish trust between them because they trust the CA (or chain of CAs) to have performed an appropriate entity authentication, and the CA's signing of the certificate attests to this fact. Upon exchange of the digital certificates to authenticate the KMF 102 and KMF 104 to each other, the KMF 102 and the KMF 104 provide their respective public keys to the other device and may also send the associated public key cryptographic algorithm and the symmetric key cryptographic algorithm used to carry out the two cryptographic techniques.

KMF 102 generates (204) two (a first and a second) key management messages (KMMs) that are used to securely transport the applicable symmetric KEKs and TEKs. The first KMM includes a first KEK and a KMM encryption key, and the second KMM includes a set of symmetric encryption keys. In one illustrative embodiment, each KMM has a data structure illustrated in FIG. 3. Accordingly, the first KMM (302) includes a header 308 and a body 306. Header 308 includes, for example, the following fields: Message ID, Message Length, Message Format, Destination RSI, Source RSI, and Message Number. The Message ID field contains a new reserved Message ID value that uniquely identifies the KMM 302, and the other fields within the header 308 can be used similarly to such fields contained in a conventional KMM header. The body 306 of KMM 302 includes a UKEK 310 (which is the first KEK) and a TEK-O 312 (which is the KMM encryption key).

The second KMM (304) includes a header 328 and a body 326. Header 328 includes, for example, the following fields: Message ID, Message Length, Message Format, Destination RSI, Source RSI, and Message Number. The Message ID field contains a new reserved Message ID value that uniquely identifies the KMM 304, and the other fields within the header 328 can be used similarly to such fields contained in a conventional KMM header. The body 326 of KMM 304 includes the set of symmetric encryption keys key 1 (318) to key n (320). For example, key 1 to key n could be comprised of a set of TEKs for ultimately provisioning in end devices 122, 124, and 126 to enable these devices to securely communicate with each other and with end devices 112, 114, and 116.

KMF 102 encrypts (206) the set of symmetric encryption keys key 1 to key n using the UKEK and an appropriate symmetric key cryptographic algorithm and encrypts (208) both the UKEK and the TEK-O with a first public key (also referred to as PK-1) for KMF 104 and an appropriate public key cryptographic algorithm. This PK-1 is part of a public key/private key pair generated to implement public key cryptography and was verified during the authentication process 202. In an embodiment, KMF 102 uses a message authentication code (MAC) algorithm to generate a MAC 324 for KMM 304 and optionally for KMM 302 (e.g., 322) to protect the data integrity and authenticity of these messages by allowing the receiving device to detect any changes to the message content. Where a combined KMM is generated, a single MAC may be sufficient to ensure the authenticity of the combined KMM.

The KMF 102 further encrypts (210) KMM 304 using the TEK-O, and adds a DLI KMM Preamble 326, 328, respectively to KMM 302 and KMM 304 before sending (218) the KMMs to KMF 104. Each DLI KMM Preamble includes the following fields: Version Number, Manufacturer's ID, Algorithm ID, Key ID, and Message Indicator. The Version Number field indicates the version of the KMM format. The Manufacturer's ID field indicates whether the KMM uses a standard or proprietary format. The possible values are the P25 standard value, and the manufacturer's specific value. The Key ID, Algorithm ID and Message Indicator are used by the receiving device for the decryption operation that needs to be applied to the KMM. The later three fields are also collectively known as "Esync".

Figure 3:
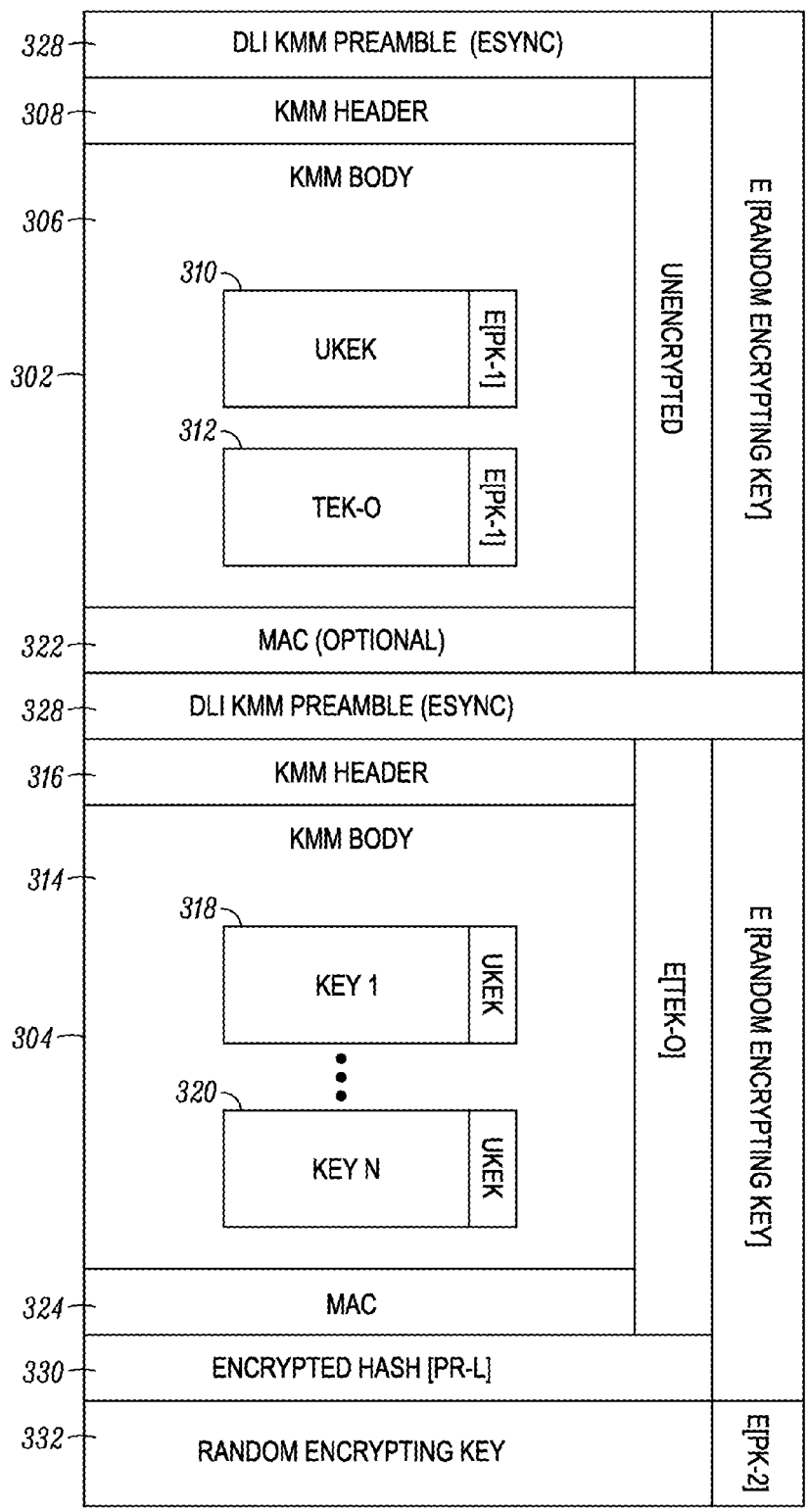
FIG. 3 is a message bundle generated at a sending device that enables secure sending of symmetric encryption keys to a receiving device in accordance with some embodiments.

In an embodiment that provides additional security while sending the KMMs, KMF 102 also performs additional functionality 212, 214, and 216, as further described herein by reference to FIG. 3 before sending the two KMMs to KMF 104. At 212, the KMF 102 digitally signs (212) the first and/or second KMM. In the illustrative combined KMM 300, the KMF 102 digitally signs 330 the combined KMM 300 by forming a message digest (i.e., a hash) of KMMs 302 and 304 using an appropriate hash function. This hash is then signed by the KMF 102 using its private key (PR-L) to form the encrypted hash 330, i.e., the digital signature. KMF 102 further generates (214) a random encrypting key, which is used to encrypt one or both of the two KMMs (in the case of the embodiment shown in FIG. 3, both KMMs, including the DLI KMM Preambles 326 and 328, are encrypted using the random encrypting key). Any suitable key generator may be used for this function such as a Wired Equivalent Privacy (WEP) random key generator used in Institute of Electrical Engineers (IEEE) 802.11 wireless networks. The random encrypting key is encrypted using a second public key (PK-2) of KMF 104 and an appropriate public key cryptographic algorithm, and the encrypted random encrypting key 332 is attached to the combined KMM 300 before the combined KMM 302 is sent (218) to KMF 104. This PK-2 is part of a public key/ private key pair generated in KMF 104 to implement public key cryptography and was verified during the authentication process 202.

Depending on the level of security desired in system 100, the first and second public keys (PK-1 and PK-2) of KMF 104 may be the same (for a less secure system) or different (for a more secured system). Similarly, depending on the level of security desired in system 100, the UKEK and TEK-O may be the same (for a less secure system) or different (for a more secured system). Moreover, the KMMs 302 and 304 may be sent using any number of means including, but not limited to, over-the-air, via email, using a USB stick, etc.

Figure 4:
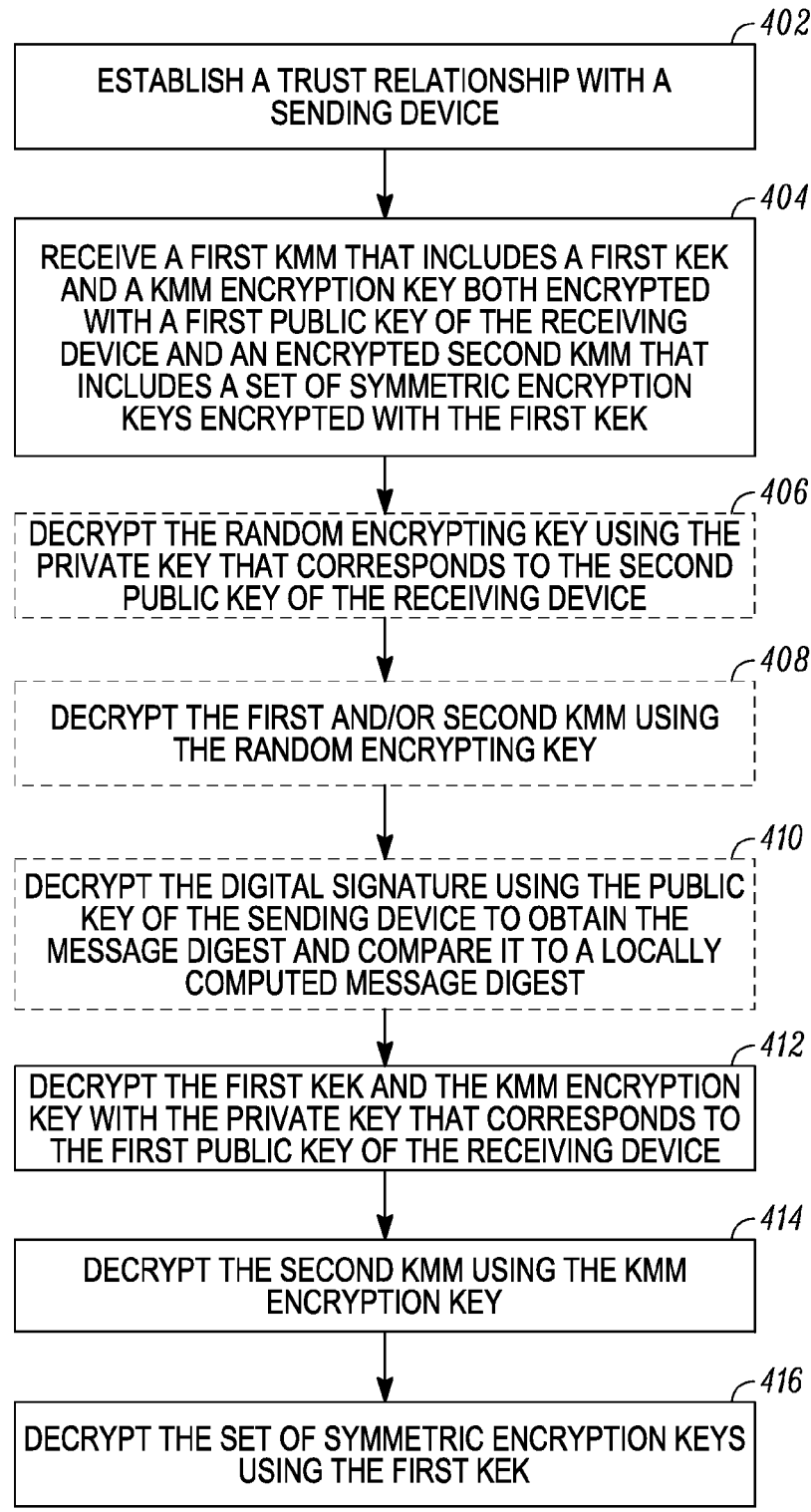
FIG. 4 is a flow diagram of a method implemented in a receiving device for enabling secure receipt of symmetric encryption keys from a sending device in accordance with some embodiments.

FIG. 4 illustrates a method 400 performed in a receiving device, upon receipt of the two KMMs (and in one particular embodiment upon receipt of the combined KMM 300) to retrieve and use the KEKs and TEKs included therein. Any receiving device can implement method 200 to securely receive symmetric encryption keys from any sending device. However, for ease of understanding, method 400 is described below by reference to KMF 104 and the end devices 122, 124, and 126 as illustrative receiving devices. However, this illustrative example in no way limits the scope of the types receiving devices that may implement method 400 and in no way limits the types of sending devices that forward the symmetric encryption keys.

Accordingly, by reference to FIG. 1 in this illustrative example, A KMF or end device, may implement method 400 illustrated by reference to FIG. 4 to securely receive and retrieve symmetric encryption keys sent from a KMF in the two KMMs. For instance, the processing device of the receiving device is programmed with logic for performing at least some of the functional steps of method 400 as hereinafter described; thereby being implemented as a special purpose processor or special purpose computer programmed to perform method 400. In other words, this special purpose computer is the structure that serves as the means for performing the functionality of method 400.

Presumably, the KMF 104 has already established (402) a trust relationship with KMF 102 (e.g., as described above by reference to functionality 202 in FIG. 2; moreover a similar PKI certificate exchange process as described by reference to functionality 202 may be performed between the KMF 104 and devices 122, 124, 126 to establish trust between these devices, or another suitable authentication method may be used). Therefore, upon receipt (404) of the first and second KMMs (e.g., the combined KMM 300), KMF 104 proceeds to process the KMMs to retrieve the symmetric encryption keys included therein.

Where KMF 102 performs functionality 212, 214, and 216, KMF 104 performs corresponding functionality 406, 408, 410. Accordingly, upon receipt of the combined KMM 300, KMF 104 decrypts (406) the random encrypting key 332 using its private key corresponding to PK-2 and decrypts (408) KMM 300 (comprising of the two KMMs 302 and 304 and the digital signature 330) using the random encrypting key. KMF 104 further decrypts (410) the digital signature 330 using the public key of KMF 102 that corresponds to PR-L to obtain the message digest of the two KMMs 302 and 304. KMF 104 knows (e.g., has stored therein) the hash function used to generate the message digest and uses this hash function to locally compute the message digest of the two KMMs. KMF 104 then compares the locally computed message digest with the message digest in the received message; and if the two are equal, the message 300 is assumed to be authentic.

KMF 104 uses its private key that corresponds to PK-1 to decrypt (412) the UKEK and TEK-O in the first KMM 302. KMF 104 then decrypts (414) the second KMM 304 using TEK-O to obtain the encrypted set of symmetric encryption keys 1 to key n. KMF 104 may decrypt (416) the shared keys present in the second KMM 304 using the UKEK. In an embodiment, the KMF stores the symmetric encryption keys either in an encrypted or decrypted state depending on the level of security desired and further provisions (for example using method 200) the devices 122, 124, and 126 with the shared symmetric TEKs, retrieved from the KMM 304, for use in protecting media traffic sent within system 100.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods 200 and 400 and associated apparatus for securely transferring symmetric encryption keys described herein. The non-processor circuits may include, but are not limited to, a radio receiver, a radio transmitter, signal drivers, clock circuits, power source circuits, and user input devices. As such, these functions may be interpreted as steps of a method to perform the secure transfer of symmetric encryption keys described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for secure transfer of symmetric encryption keys, the method comprising:
at a sending device:
generating a first and a second key management message (KMM), wherein the first KMM includes a first key encryption key and a KMM encryption key, and the second KMM includes a set of symmetric encryption keys;
encrypting the set of symmetric encryption keys, included in the second KMM, using the first key encryption key;
encrypting the first key encryption key and the KMM encryption key, included in the first KMM, using a first public key of a receiving device;
encrypting the second KMM using the KMM encryption key to generate an encrypted second KMM; and
sending the first KMM and the encrypted second KMM to the receiving device;
wherein the first key encryption key and the KMM encryption key are the same key;
wherein the first KMM and the encrypted second KMM is sent to the receiving device in one combined KMM;
further comprising the sending device digitally signing the combined KMM before sending the combined KMM to the receiving device;
further comprising:
at the sending device:
generating a random encrypting key; and
encrypting the combined KMM using the random encrypting key before sending the combined KMM to the receiving device;
further comprising:
encrypting the random encrypting key using a second public key of the receiving device to generate an encrypted random encrypting key; and appending the encrypted random encrypting key to the combined KMM before sending the combined KMM to the receiving device.

2. The method of claim 1 further comprising the sending device digitally signing at least one of the first KMM or the encrypted second KMM before sending the first KMM and the encrypted second KMM to the receiving device.

3. The method of claim 2 further comprising:
at the sending device:
generating a random encrypting key; and
encrypting the at least one of the first KMM or the encrypted second KMM using the random encrypting key before sending the first KMM and the encrypted second KMM to the receiving device.

4. The method of claim 3 further comprising:
at the sending device:
encrypting the random encrypting key using a second public key of the receiving device to generate an encrypted random encrypting key; and
appending the encrypted random encrypting key to the at least one of the first KMM or the encrypted second KMM before sending the first KMM and the encrypted second KMM to the receiving device.

5. The method of claim 4, wherein the first and second public keys of the receiving device are the same key.

6. The method of claim 1 further comprising the sending device exchanging digital certificates with the receiving device to obtain the first public key of the receiving device prior to sending the key management messages to the receiving device.

7. A device for secure transfer of symmetric encryption keys, the method comprising:
means for generating a first and a second key management message (KMM), wherein the first KMM includes a first key encryption key and a KMM encryption key, and the second KMM includes a set of symmetric encryption keys;
means for encrypting the set of symmetric encryption keys, included in the second KMM, using the first key encryption key;
means for encrypting the first key encryption key and the KMM encryption key, included in the first KMM, using a first public key of a receiving device;
means for encrypting the second KMM using the KMM encryption key to generate an encrypted second KMM; and
means for sending the first KMM and the encrypted second KMM to the receiving device;
wherein the first key encryption key and the KMM encryption key are the same key;
further comprising the sending device digitally signing at least one of the first KMM or the encrypted second KMM before sending the first KMM and the encrypted second KMM to the receiving device;
further comprising:
means for generating a random encrypting key; and
means for encrypting at least one of the first KMM or the encrypted second KMM using the random encrypting key before sending the first KMM and the encrypted second KMM to the receiving device;
further comprising:
means for encrypting the random encrypting key using a second public key of the receiving device to generate an encrypted random encrypting key; and
means for appending the encrypted random encrypting key to the at least one of the first KMM or the encrypted second KMM before sending the first KMM and the encrypted second KMM to the receiving device.

* * * * *